July 7, 1942.　　　　J. G. SAND　　　　2,288,957
WEEDING IMPLEMENT
Filed Aug. 15, 1941　　　2 Sheets-Sheet 1
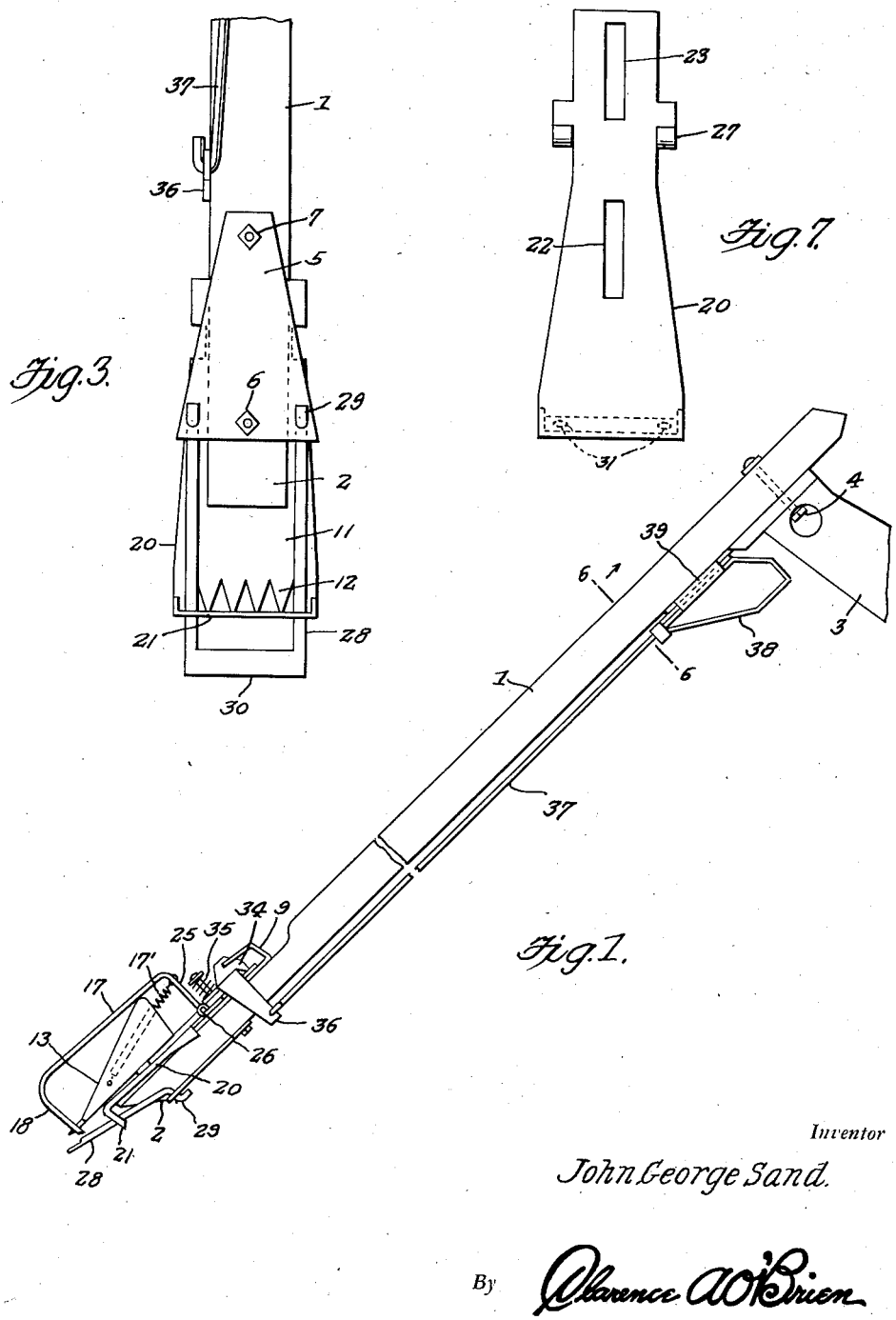
Inventor
John George Sand.
By Clarence A. O'Brien
Attorney

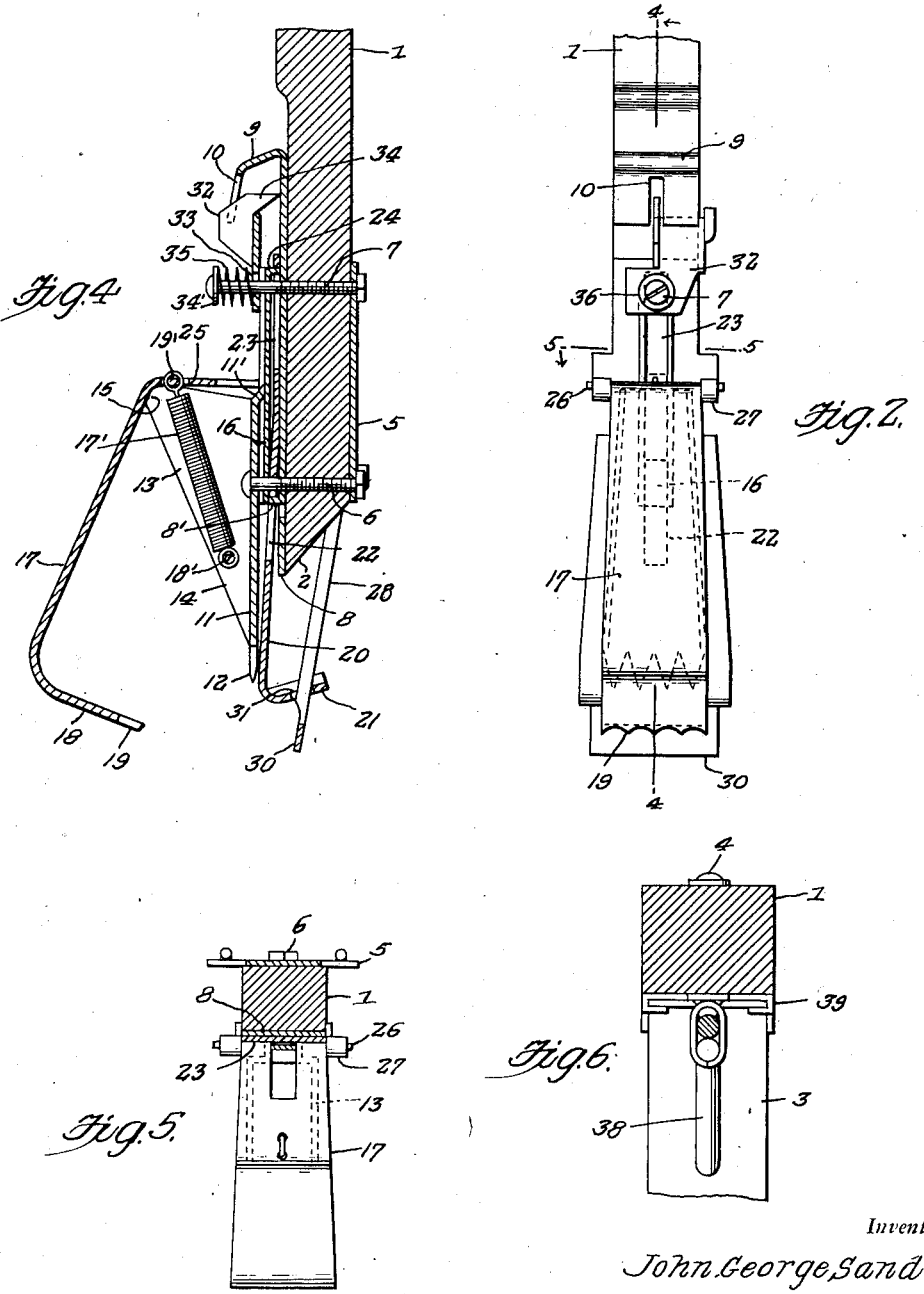

Patented July 7, 1942

2,288,957

UNITED STATES PATENT OFFICE 2,288,957

WEEDING IMPLEMENT

John George Sand, Galion, Ohio

Application August 15, 1941, Serial No. 407,046

2 Claims. (Cl. 294—50.9)

My invention relates to improvements in weeding implements for use on lawns, in gardens, and the like, the principal object in view being to provide a simply constructed device of this character which is easy to handle, quick and reliable in operation, and adapted for weeding by an operator standing erect.

To the accomplishment of the above, and subordinate objects presently appearing, a preferred embodiment of my invention has been illustrated in the accompanying drawings, set forth in detail in the succeeding description, and defined in the claims appended hereto.

In said drawings:

Figure 1 is a view in side elevation of the preferred embodiment of my improved weeding implement, Figure 2 is a fragmentary view in rear elevation of the front end portion of the implement, Figure 3 is a similar view in rear elevation, Figure 4 is a view in longitudinal section taken on the line 4—4 of Figure 2, Figure 5 is a view in transverse section taken on the line 5—5 of Figure 2, Figure 6 is a view in transverse section taken on the line 6—6 of Figure 1, and Figure 7 is a plan view of the jaw operating slide detached.

Referring now to the drawings by numerals, my improved implement, as illustrated, comprises a bar-like shank 1 of any suitable length and material and which is preferably square cross-section and provided with an undercut beveled front end 2. Extending, at a convenient angle, from what constitutes the rear side of the shank 1, and adjacent the rear end thereof, is a pistol grip handle 3 bolted to said shank as at 4. On the rear side of the shank 1 and extending rearwardly from the front end 2 for a suitable distance is a bearing plate 5 projecting at its front end laterally beyond the sides of said shank. A pair of bolts 6, 7 extended through the plate 5 and shank 1 and spaced longitudinally and centrally in the shank secure the plate 5 to said shank. On the side of the shank 1 is an elongated front bearing plate 8 extending from the front end of the shank rearwardly along the same for a suitable distance and which is of substantially the same width as said shank 1, said plate 8 being secured in place by the bolts 6, 7 and provided with a right angled upstanding flange 9 having a central forwardly opening slot 10 therein for a purpose presently seen.

Spaced from the bearing plate 8 is an overlying fixed jaw member 11 of plate-like form extending forwardly of the front end 2 of the shank 1 and equipped with a serrated front edge 12, said jaw member having a pair of triangular side flanges 13 upstanding therefrom in right angular relation thereto and being provided with longitudinal edges 14 inclining downwardly and forwardly thereof and forming on the rear of said jaw member a pair of rounded corner bearings 15.

Cooperating with the fixed jaw member 11 is a movable plate-like jaw member 17 overlying the jaw member 11 and fulcruming on said corner bearings 15 for movement toward and from the fixed jaw member 11 and also sliding forwardly and rearwardly on said bearings 15 for a purpose presently apparent. The movable jaw member 17 embodies a right angled front end 18 having a serrated edge 19 for coaction with the serrated edge 12 of the fixed jaw member 11, in a manner to be described, and which is normally spaced forwardly of said edge 12.

Interposed between the bearing plate 8 and the fixed jaw member 11 is a jaw operating slide 20 embodying a rearwardly inclined front end flange 21 normally spaced forwardly beyond the edge 12 of the fixed jaw member 11, said slide also extending forwardly of the front end 2 of the shank 1 and being mounted for movement forwardly and rearwardly on the bearing plate 8 by means of a pair of front and rear slots 22, 23, and the bolts 6 and 7 which extend through said slots. Intermediate the jaw operating slide member 20 and the fixed jaw member 11 is an anchor plate 16 for the latter through which the bolts 6 and 7 extend and to which a rear, inclined flange 11' on said member 11 is suitably secured by welding, not shown. A lug 8' struck up from the bearing plate 8 and extending into slots 22 of member 20 and a similar lug 24 on anchor plate 16 extending into slot 23 of said member 20 guide the latter in its forward and rearward movements.

Operating connections between the slide 20 and the movable jaw member 17 are provided in the form of an angular rear end flange 25 on said member 17 located in the rear of the fixed jaw member 11 and suitably pivoted, at its sides, as at 26, to a pair of laterally spaced ears 27 on the slide 20.

A coil spring 17' within the fixed jaw member 11 has one end connected, as at 18', to said fixed jaw member and the other end connected, as at 19', to the flange 25 of the movable jaw member 17, the arrangement being such that said spring tensions the flange 25 to swing the jaw member 17 to open position, such swinging of said jaw member 17, through the connections 26, 27 moving the slide 20 into the limit of its forward movement as established by engagement of the rear end of the rear slot 23 with the lug 24.

Extending forwardly of the shank 1 from the front end of the bearing plate 5 is a U-shaped digger knife 28 having terminals swingably mounted, as at 29, in the projecting sides of the bearing plate 5, and also having a straight transverse front end 30, the arrangement being such that said knife presents a leading straight transverse edge in front of the jaw members 11 and 17 and also in front of the slide 20, and said knife is reciprocable toward and from the slide 20. A pair of suitable apertures 31 in the flange 21 of slide 20 provides for the extension of the sides of the digger knife 28 through said flange to slide in the latter.

Opposed to the plate 16 is a trigger 32 of plate-like form having a front end slot 33 by means of which it is mounted on the lug 24 to rock on the bolt 7 toward and from the slide 20, said trigger having a rear end beak 34 adapted to snap into the rear slot 23 of the slide 20 and latch the slide in a rearward limit of movement thereof, said beak projecting into the slot 10 of the flange 9 whereby the trigger is guided during its operation. A coil spring 35 interposed between the trigger 33 and a washer 34' on the bolt 7 tensions said trigger to enter the slot 23. The trigger 33 embodies an operating arm 36 extending rearwardly alongside the shank 1 transversely thereof to which one end of a trigger operating rod 37 is suitably pivoted. The other end of said rod 37 has formed thereon a loop-like hand grip 38 suitably mounted for rearward and forward sliding movement in front of the grip 3 in a pair of guides 39 fast on the rear side of the shank 1.

Referring now to the operation of the described implement, with the shank 1 held at a convenient angle, the edge 30 of the digger knife 28 is thrust into the ground against the roots of a weed with the stem of the weed and foliage interposed between the jaw members 11, 17 and the root severed. As the digger knife 28 is forced into the ground, the flange 21 of the slide 20 abuts the ground and under thrust thereagainst the slide 20 is moved rearwardly into its limit of rearward movement and latched against forward movement by the described snap action engagement of the trigger beak 34 with the rear slot 23 of said plate. Initial rearward movement of the slide 20 causes the movable jaw member 17 to fulcrum on the corner bearings 15 and close on the fixed jaw member 11 to move the serrated edge 19 in front of the edge 12 of the fixed jaw member 11, and further movement of said slide 20 causes the movable jaw member 17 to slide rearwardly on said bearings 15 to move the serrated edge 19 thereof into engagement with the serrated edge 12 of the fixed jaw member 11 to thereby grip and hold the severed weed in said jaw members. To deposit the weed just severed in a desired receptacle, it is merely necessary to pull rearwardly on the hand grip 38, thereby, in a manner which will be clear, swinging the trigger 33 outwardly of the slide 20 on the bolt 7 to release said slide. Upon release of the slide 20, the movable jaw member 17 will be opened by the spring 17' to release the weed and the slide 20 will be returned to normal position. As will be clear, when the slide 20 moves rearwardly, the digger knife 28 swings on the bearing plate 5 toward the fixed jaw member 11 thereby permitting the jaw members to move down over the weed close to the ground and thus facilitate gripping of the weed by said jaw members.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claims.

What I claim is:

1. A weeding implement comprising an elongated shank, a pair of relatively fixed and movable jaw members at one end of the shank, the movable member being swingable and slidable toward and from the fixed member into and from clamping relation thereto, respectively, and means to operate said movable member toward the fixed member comprising a slide on said end of the shank extending beyond the same and movable longitudinally thereof in one direction under thrust against the ground.

2. A weeding implement comprising an elongated shank, a pair of relatively fixed and movable jaw members at one end of the shank, the movable member being operative toward and from the fixed member into and from clamping relation thereto, respectively, means to operate said movable member toward the fixed member comprising a slide on said end of the shank extending beyond the same and movable longitudinally thereof in one direction under thrust against the ground, and a digger knife extending from said one end of the shank in advance of said slide for insertion in the ground to sever a weed prior to thrust of the slide against the ground, said knife being pivotally mounted for swinging toward the jaw members in the clamping relation of the latter, said slide being operatively connected to said knife to swing the same.

JOHN GEORGE SAND.